W. J. BREWER.
ROLLER BEARING.
APPLICATION FILED JULY 2, 1909. RENEWED APR. 7, 1910.
958,586.
Patented May 17, 1910.
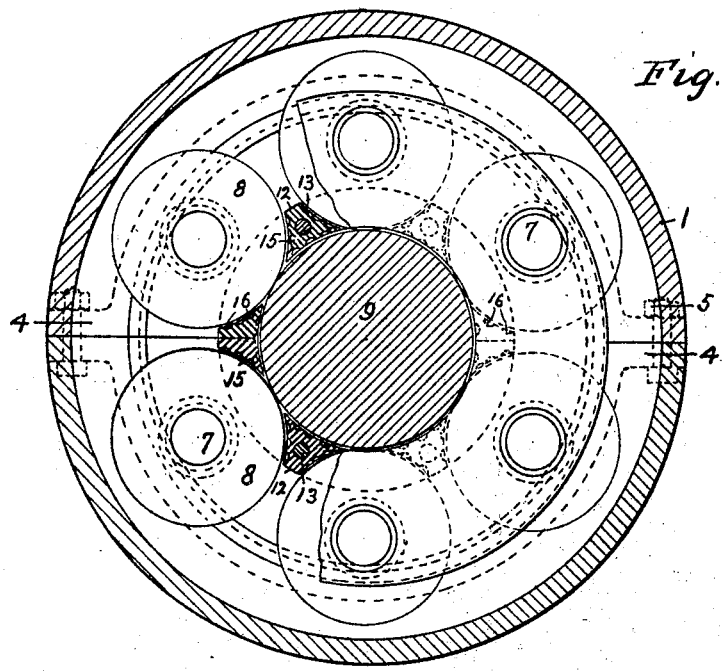
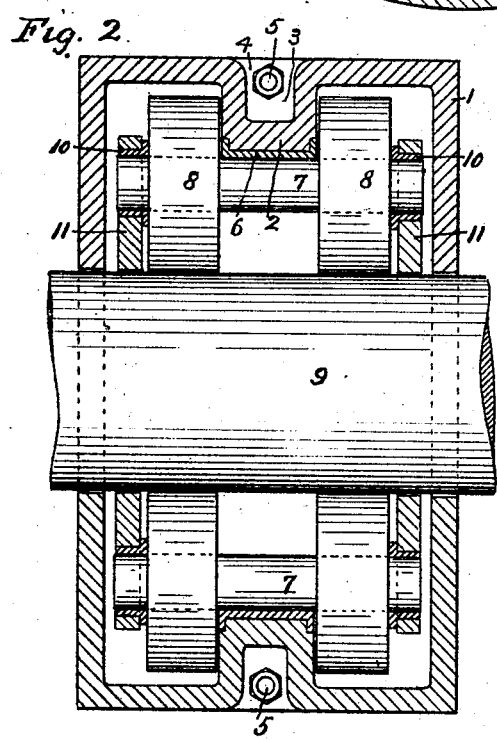
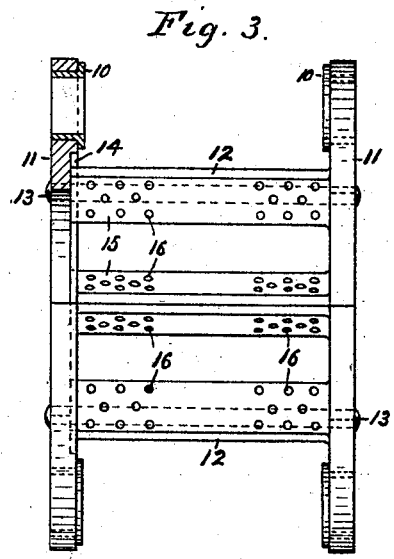
Witnesses:
F. Martell
C. W. Powell
Inventor
Wm. J. Brewer
By his Attorney
Wm Bodge

UNITED STATES PATENT OFFICE.

WILLIAM J. BREWER, OF BROOKLYN, NEW YORK.

ROLLER-BEARING.

958,586. Specification of Letters Patent. Patented May 17, 1910.

Application filed July 2, 1909, Serial No. 505,539. Renewed April 7, 1910. Serial No. 554,045.

*To all whom it may concern:*

Be it known that I, WILLIAM J. BREWER, a subject of the King of England, and resident of Brooklyn, in the county of Kings and State of New York, have invented certain new and useful Improvements in Roller-Bearings, of which the following is a specification.

The invention relates to improvements in roller-bearings and is particularly applicable to car-axle journals, which as ordinarily used are periodically subjected to excessive loads due to shock or vibration caused by the unevenness of the track or roadbed; and the object of the invention is to provide a bearing of the antifriction-roller type adapted to operatively receive the normal working loads, and to further provide auxiliary supporting means acting through the axle and rollers for receiving the incidental stresses due to shock or abnormal loading, to avoid excessive pressure upon the working parts.

A further object is to provide means for effectively lubricating such working parts; and the invention also includes certain details of construction hereinafter set forth.

In describing the invention in detail reference is had to the accompanying drawings, forming part of this specification, and wherein like characters of reference are used to designate like parts throughout the several views, and in which:

Figure 1 is a transverse view, partly in section, of the improved bearing embodying my invention; Fig. 2, a longitudinal view of the same, partially in section; and Fig. 3 is a detail view of the roller-retaining rings, a portion of one of said rings being in section.

The box or casing 1 is diametrically divided in halves and interiorly provided with an annular bearing-ledge 2, having walls adapted to form a pair of semiannular recesses 3 and flanges 4, the latter receiving the bolts 5 for detachably connecting the half boxes together, the bolts being positioned within the recesses to preserve a regular exterior for the box. Secured in a convenient manner to the bearing ledge 2, is a flanged wearing-sleeve or liner 6, engaged by the central journals or spindles 7 of a series of antifriction rollers 8, arranged in pairs on opposite sides of the bearing-ledge. The rollers engage the central axle or shaft 9, and are retained in positive alinement with one another by the projecting spindles or journal-ends engaging the renewable bushes 10, detachably secured in the retainer-rings 11, which loosely embrace the axle 9. The two retainer-rings are connected together by transverse bearing-bars 12 and tie-rods 13, the bearing-bars being integrally formed at one end with one of the rings and their opposite ends engaging an annular recess 14, formed in the opposite ring to receive and transmit the thrust upon said bars. Each bearing-bar is provided with a series of bearing-surfaces 15, so disposed as to merely clear the axle 9 and the periphery of the rollers 8 when working under a normal load. Pockets or recesses 16 are formed in the bearing-surfaces to receive and distribute a suitable lubricant.

The retainer-rings are divided through a pair of opposite bearing-bars into two parts, and by the disconnection of the flange-bolts 5, the outer box or casing and the retainer-rings with their associated rollers may be readily removed without disturbing the position of axle 9 or disconnecting the rollers from the two-part retainer-rings. The several parts may likewise be readily assembled and a suitable lubricant of graphite be introduced, and by suitable clearances between the rollers and the annular bearing-ledge 2, the alinement of the retainer-rings together with their connected parts will be preserved in operative engagement within the casing.

The casing or box may be secured to the axle-frame (not shown) in any well-known manner, and the normal working-load transmitted thereto from the rotatable axle 9 through the rollers 8 and the reduced journals 7 to the stationary bearing-ledge 2, causing a relatively slow rolling movement of the two latter surfaces and a consequent reduction of wear. It will be evident that the rotation of the rollers will cause a relatively slow rotation of the retainer-rings and their connected bearing-bars about the axle which will effect a distribution of the lubricant over the movable parts, such distribution being augmented by the pockets formed in said bearing-bars.

When working under an abnormally excessive load tending to spring or strain any of the movable parts, the bearing-surfaces of the bearing-bars will temporarily engage the axle and transmit such load therethrough to the peripheral surface of the rollers, and by reason of such additional bearing-surface will reduce the excessive stress upon the working contact surface formed by the axle and the peripheries of the rollers, and will act as an auxiliary support for this relatively high rotating part.

What I claim as my invention and desire to secure by Letters Patent, is:

1. In a roller-bearing, the combination with a box or casing provided with an interior annular bearing-ledge, an axle or shaft mounted in the casing and relatively rotatable thereto, roller-retaining rings disposed within said casing, bearing-bars connecting said rings and adapted for incidental engagement with said shaft, a series of rollers loosely journaled in the retainer-rings engaging said shaft and adapted for incidental engagement with the bearing-bars of said rings, and reduced journals formed on the rollers for engagement with said annular bearing-ledge.

2. In a roller-bearing, the combination with a box or casing provided with an interior annular bearing-ledge, an axle or shaft mounted in the casing and relatively rotatable thereto, roller-retaining rings disposed within said casing, bearing-bars connecting said rings and provided with recessed bearing-surfaces adapted in part for incidental engagement with said shaft, a series of rollers loosely journaled in the retainer-rings engaging said shaft and adapted for incidental engagement with the bearing-surfaces of the bearing-bars, and reduced journals formed on the rollers for engagement with said annular bearing-ledge.

3. In a roller-bearing, the combination with a box or casing provided with an interior annular bearing-ledge, of an axle or shaft mounted in the casing and relatively rotatable thereto, roller-retaining rings disposed within said casing, bearing-bars connecting said rings and adapted for incidental engagement with said shaft, a series of spindles journaled in the retainer-rings and engaging the annular bearing-ledge, and rollers secured to the spindles on opposite sides of the bearing-ledge engaging said shaft and adapted for incidental engagement with the bearing-bars of said rings.

4. In a roller-bearing, the combination with an axle, a two-part box or casing therefor, an annular bearing-ledge formed within said casing and having exteriorly recessed walls and flange-connection members, roller-retaining rings disposed within said casing, bearing-bars connecting said rings and adapted for incidental engagement with said axle, a series of rollers journaled in the retainer-rings engaging said axle and adapted for incidental engagement with the bearing-bars of said rings, and reduced journals in connection with the rollers for engagement with said annular bearing-ledge.

5. In an axle-roller-bearing, a roller-retaining ring comprising two side members and transversely connected bearing-bars, the latter adapted to engage the faces of the rollers and axle under excessive loads.

6. In an axle-roller-bearing, a roller-retaining ring comprising two side members and transversely connected bearing-bars, the latter having recessed bearing-faces adapted to engage the faces of the rollers and axle under excessive loads.

Signed at city of Troy in the county of Rensselaer and State of New York this 26 day of June A. D. 1909.

WILLIAM J. BREWER.

Witnesses:
 FRANK J. DAVIS,
 MARGARET DAVIS.